United States Patent [19]
Smith

[11] Patent Number: 5,385,332
[45] Date of Patent: Jan. 31, 1995

[54] FLOW STABILIZED, RETRACTABLE SEAL, DOUBLE-BLOCK AND BLEED PLUG VALVE

[75] Inventor: Gordon M. Smith, Brookshire, Tex.

[73] Assignee: Johnston Pump/General Valve, Inc., Brookshire, Tex.

[21] Appl. No.: 187,892

[22] Filed: Jan. 28, 1994

[51] Int. Cl.⁶ .............................................. F16K 39/06
[52] U.S. Cl. ..................................... 251/283; 251/121; 251/309
[58] Field of Search ............... 251/121, 281, 283, 309, 251/356

[56] References Cited

U.S. PATENT DOCUMENTS

| | | | |
|---|---|---|---|
| 1,409,691 | 3/1922 | Farmer | 251/283 X |
| 1,680,812 | 8/1928 | Sloan | 251/283 |
| 3,066,909 | 12/1942 | Reed, Jr. | 251/283 X |
| 3,430,919 | 3/1969 | Frazier | 251/283 |
| 3,475,003 | 10/1969 | Paluszek | 251/283 X |
| 3,591,129 | 7/1971 | Hulsey | 251/118 |
| 3,689,026 | 9/1972 | Self | 251/309 |
| 3,814,378 | 6/1974 | Wurzburger | 251/283 |
| 3,826,281 | 7/1974 | Clark | 251/118 X |
| 3,960,177 | 6/1976 | Baumann | 251/305 X |
| 4,036,470 | 7/1977 | Illing | 251/283 X |
| 4,037,818 | 7/1977 | Soderberg et al. | 251/121 |
| 4,103,868 | 8/1978 | Thompson | 251/283 |
| 4,135,544 | 1/1979 | MacLeod | 251/283 X |
| 4,293,163 | 10/1981 | Braddick | 251/283 |
| 4,623,119 | 11/1986 | van der Wiel | 251/163 |
| 4,982,928 | 1/1991 | Avelov | 251/118 |
| 5,011,115 | 4/1991 | Smith et al. | 251/161 |
| 5,018,703 | 5/1991 | Goode | 251/127 |
| 5,052,657 | 10/1991 | Winsip | 251/283 X |
| 5,116,019 | 5/1992 | Rohweder et al. | 251/309 X |

FOREIGN PATENT DOCUMENTS 72029  4/1947  Norway ..................... 251/283

Primary Examiner—John Rivell
Attorney, Agent, or Firm—Leonard Tachner

[57] ABSTRACT

Fluid pressure changes are imposed on selected interior surfaces of a plug passageway of a plug valve to create torque. In one embodiment perturbations are provided in selected flow surfaces of the valve plug to create turbulent boundary layer flow along such surfaces which generates a beneficial stabilizing torque tending to reduce or eliminate holding forces conventionally provided by mechanical parts such as detent mechanisms. In another embodiment, pilot holds between interior and exterior plug surfaces are used to alter the fluid pressure at diagonally opposite locations relative to the plug rotation axis to produce the stabilizing torque.

10 Claims, 4 Drawing Sheets

FLOW STABILIZED, RETRACTABLE SEAL, DOUBLE-BLOCK AND BLEED PLUG VALVE

BACKGROUND OF THE INVENTION

1. Field of the Invention

The present invention relates generally to a retractable seal double-block and bleed plug valves and more specifically, to a plug therefor which incorporates a boundary layer affecting surface perturbations in selected flow surfaces of the valve plug to create turbulent boundary layer flow which generates a beneficial stabilizing torque tending to reduce or eliminate holding forces conventionally required by mechanical parts such as detent mechanisms.

2. Prior Art

Presently double-block and bleed plug valves throughout the valve industry have their plugs held open by mechanical detents. On lever operated valves the open plug position is maintained by handles which drop into recesses. On hand operated valves the open plug position is maintained by detent plungers dropping into recesses. On gear operated valves the open plug position is maintained by self-locking worm gears. Each of these techniques to keep the valve open is needed in conventional plug-type valves because of the closing torque that is generated by flow through the open plug of the valve. Such a closing torque which is inherent in both flow-through plug-type valves can slam the valve shut causing a dangerous water-hammer effect which can produce piping failures and valve leaks which in some cases can threaten the environment. Thus, it has been necessary in prior art plug-type valves to provide mechanical means for resisting the closing torque resulting from the flow-through plus. However, special detent mechanisms, special worm gears and the like all increase the cost of the valve while at the same time presenting a potential reliability problem because of the mechanical wear on such mechanisms for resisting the closing torque.

Thus it would be a highly advantageous characteristic of plug-type valves if it were possible to provide a configuration which produced a torque responsive to flow in the opening direction counter the normally closing direction torque that is normally produced in conventional plug-type valves by flow through the plug. It will be seen hereinafter that the present invention provides such a counter-effect torque by providing surface perturbations in selected flow surfaces of the valve plug to create turbulent boundary layer flow along such surfaces. Such turbulent boundary layer flow generates a beneficial stabilizing torque which by appropriate selection of the surfaces on which the perturbations are provided can be in a direction opposite the closing torque normally incurred in a plug-type valve of the prior art. A search of the prior art has failed to disclose any patents which describe the use of such turbulent boundary layer flow perturbations in a plug-type valve to solve the problem described herein. More specifically, the following U.S. patents were found in a search directed to the present invention, U.S. Pat. Nos.

3,430,919 Frazier
3,591,129 Hulsey
3,689,026 Self
3,814,378 Wurzburger
3,826,281 Clark
4,103,868 Thompson
4,135,544 MacLeod
4,623,119 Van der Wiel
4,982,928 Avelov
5,011,115 Smith et al
5,018,703 Goode Of the aforementioned patents the following are deemed to be the most relevant to the present invention:

U.S. Pat. No. 4,103,868 to Thompson is directed to a ball valve having an improved ball element design with a plurality of reaction faces which, when contacted by liquid flow through the valve, serve to generally counterbalance the normal self-closing forces exerted upon the ball element by the liquid flow. The ball valve with housing and chamber, has a ball element rotatably supported with a passage positioned so as to be alignable with an inlet and outlet. The passage is defined by edge portions at the outer surface of the ball element. Each edge is interrupted by a bevelled arcuate reaction face located laterally of the axis of rotation. A flat end wall cooperates to in part balance the hydraulic moments created by fluid flow exerted upon the ball element.

U.S. Pat. No. 3,591,129 to Hulsey is directed to a valve for controlling fluid flow employing a ball-shaped closure member having a flow passage comprising an inlet portion circular in cross-section merging into an outlet end portion defined by a laterally extending slot of generally triangular shape. The valve has a tubular housing and flow ports defining a flow way, with a closure chamber for a ball-shaped closure. The ball-shaped closure has an inlet of circular shape and an outlet of generally L-shaped cross-section forming a triangular slot. A flow straightener core is installed to obviate turbulence. The straight slot and slot opening of the ball results in no wall surface of the ball subject to angular impingement by the fluid flow, hence no torsional force will tend to rotate the ball from the desired position.

U.S. Pat. No. 3,689,026 to Self is directed to an eccentric rotary plug valve with the center of the plug seat offset from the shaft axis. The valve structure with an outer housing has a closure element that is a plug or poppet supported by rods on opposite sides of the flow tube. The rods connect two operating shafts and in the closed position, the poppet or plug seats against the ring and seals fluid flow. In the open position, the tapered flow tube provides an unimpeded path through the valve.

U.S. Pat. No. 3,826,281 to Clark is directed to a ball valve with low break-away and operating torque provided by a ball with a porous core. The ball valve with body, seat and trunnions, has a ball with a porous core of sintered metal. This construction with the core providing a complete sphere with no sharp edges, prevents damage to the seal, provides good throttling control and low operating torque.

U.S. Pat. No. 5,018,703 to Goode is directed to a valve design to reduce cavitation and noise comprising a valve body having an inlet, an outlet, passages communicating with a valve chamber, a valve element, movable through the valve chamber adjacent a valve seat, and a flow deflector ring having a central opening which has discontinuous deflector surfaces around a central opening separated by spaced grooves arranged to disrupt flow, and prevent the formation of a vena contracta downstream from the valve seat. Sleeves, having cylindrical walls divide the valve chamber. An array of inlet bores are formed in the sleeve and an array of exit bores are formed in the other sleeve. The inlet bores are inclined relative to the outlet bores to form a tortuous flow path to minimize noise and cavitation as pressure is reduced in the valve chamber.

Thus there is an ongoing need for an innovation in double-block and bleed plug-type valve implementation which provides a counterbalancing torque against the inherent closing torque of plug-type valves in response to flow therethrough so that conventional methods for resisting such closing torque can be minimized or entirely eliminated thereby reducing the cost and complexity of plug-type valves and minimizing the risk of a sudden and inadvertent closure of the valve which could have deleterious effects on the entire system in which the valve is located.

SUMMARY OF THE INVENTION

The present invention comprises a plug-type valve in which the plug is made from a casting which incorporates pressure altering effects or boundary layer affecting surface perturbations such as pilot pressure passages, bumps or recesses shaped in such a way to cause either direct pressure effects or turbulent flow adjacent to the plug flow path or waterway surface, which in turn effects local flow pressure. These pilot pressure passages or surface perturbations are distributed diagonally across the plug center line on sufficiently large distributed areas to create a stabilizing effect which increases as flow increases. Generally, this effect is measured as an opening torque which is independent of the direction of flow because of the diagonal symmetry of the perturbation distribution. This simple but elegant solution to the aforementioned problem of closing torque in plug-type valves has a significant number of advantages. First and foremost, it permits elimination or at least minimization of the use of detents by minimizing or entirely eliminating the requirement for a holding force and attendant operating load to keep a plug-type valve in its open position. This minimizes the wear on detent parts which reduces the structural integrity necessary for the detent parts and which increases the reliability thus reducing the risk of sudden valve closure with its dangerous water hammer effects. It permits a reduction in the size of the operator thus reducing the energy required to open and close the valve resulting in potential environmental advantages.

In conventional plug-type valves, as flow increases, valves are made more likely to slam shut but with the stabilizing torque of the present invention, as flow increases there is also an increase in the opening force which lessens the likelihood of a slam closure. In addition, because the present invention does not depend upon a mechanical mechanism such as detents, the torque produced reacts only to flow forces and thus makes the valve relatively insensitive to mechanical vibrations which can otherwise loosen detent mechanisms. Furthermore, the ability to reduce mechanical integrity of or eliminate entirely detent mechanisms in gear operators, permits the obviation of worm gears for substitution therefor of less expensive bevel or planetary gears. In addition, minimizing detents will eliminate the need to heat treat the detent area of existing stem sets which is a very expensive process. In addition, the present invention can result in an overall reduction in the size of the operator allowing the overall valve to be cheaper, use less energy and to fit into smaller volumes. Finally, less machining and casting detail is required when detent mechanisms are eliminated or minimized.

Thus it will be seen that while the present invention is simple in concept and implementation, the advantages resulting therefrom are profound in their effect on the overall structure of the valve and the cost and reliability of the valve and the attendant piping system.

OBJECTS OF THE INVENTION

It is therefore a principal object of the present invention to provide a retractable sealed double-block and bleed plug valve which employs a flow stabilized plug which generates a stabilizing torque tending to reduce or eliminate the need for mechanical holding forces used in convention plug-type valves to resist the flow induced closing torque.

It is an additional object of the present invention to provide a flow stabilized retractable sealed double-block and bleed plug valve in which a plug is used having perturbations in selected flow surfaces to create turbulent boundary layer flow along such surfaces which generate a beneficial stabilizing torque tending to reduce or eliminate the need for holding forces conventionally provided by mechanical parts such as detent mechanisms.

It is still an additional object of the present invention to provide a flow stabilized retractable sealed double-block and bleed plug valve having a smaller and less complicated operator resulting from the minimization or elimination of the use of detents to resist the force of a closing torque produced by flow through the plug valve.

It is still an additional object of the present invention to provide an improved plug for a retractable sealed double-block and bleed plug valve the improvement comprising torque inducing perturbations to create turbulent boundary layer flow for generating a stabilizing effect which tends to keep the plug in an open position despite the generation of a closing torque resulting from the flow of media through the plug opening. The overall shape and size of the plug being identical to conventional plugs whereby the plug of the present invention can be substituted for the prior art plugs as a retrofit therefor.

It is still an additional object of the present invention to provide an improved plug valve wherein diagonally located pilot pressure passages between the interior and exterior of the plug, equalize pressure and dynamic forces on two surfaces for stabilizing the plug in an open condition.

BRIEF DESCRIPTION OF THE DRAWINGS

The aforementioned objects and advantages of the present invention as well as additional objects and advantages thereof will be better understood hereinafter as a result of a detailed description of a preferred embodiment of the invention when taken in conjunction with the following drawings in which.

DETAILED DESCRIPTION OF A PREFERRED EMBODIMENT

Figure 1:
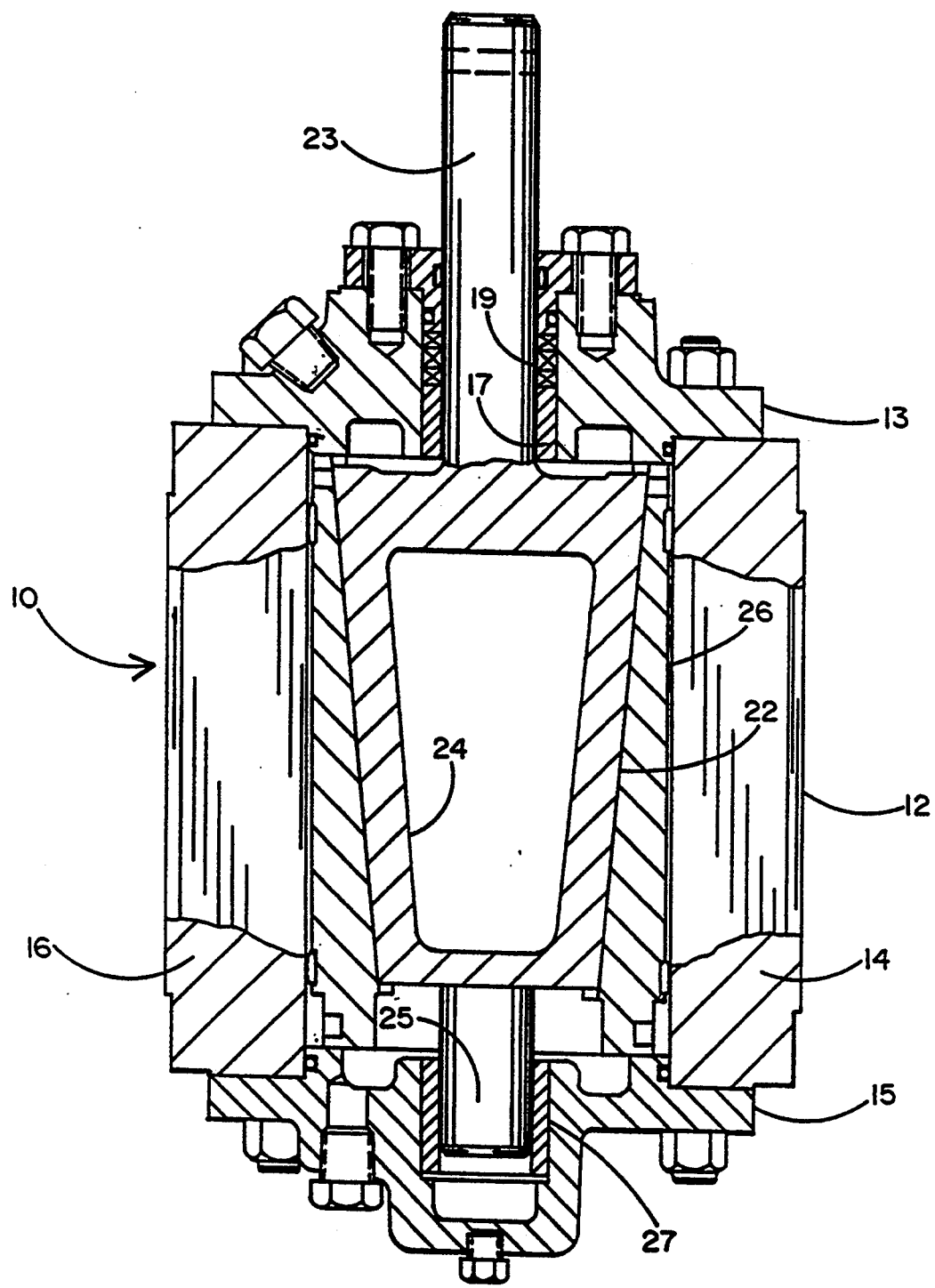
FIG. 1 is a cross-sectional view of a typical prior art retractable sealed double-block and bleed plug valve.
Figure 2:
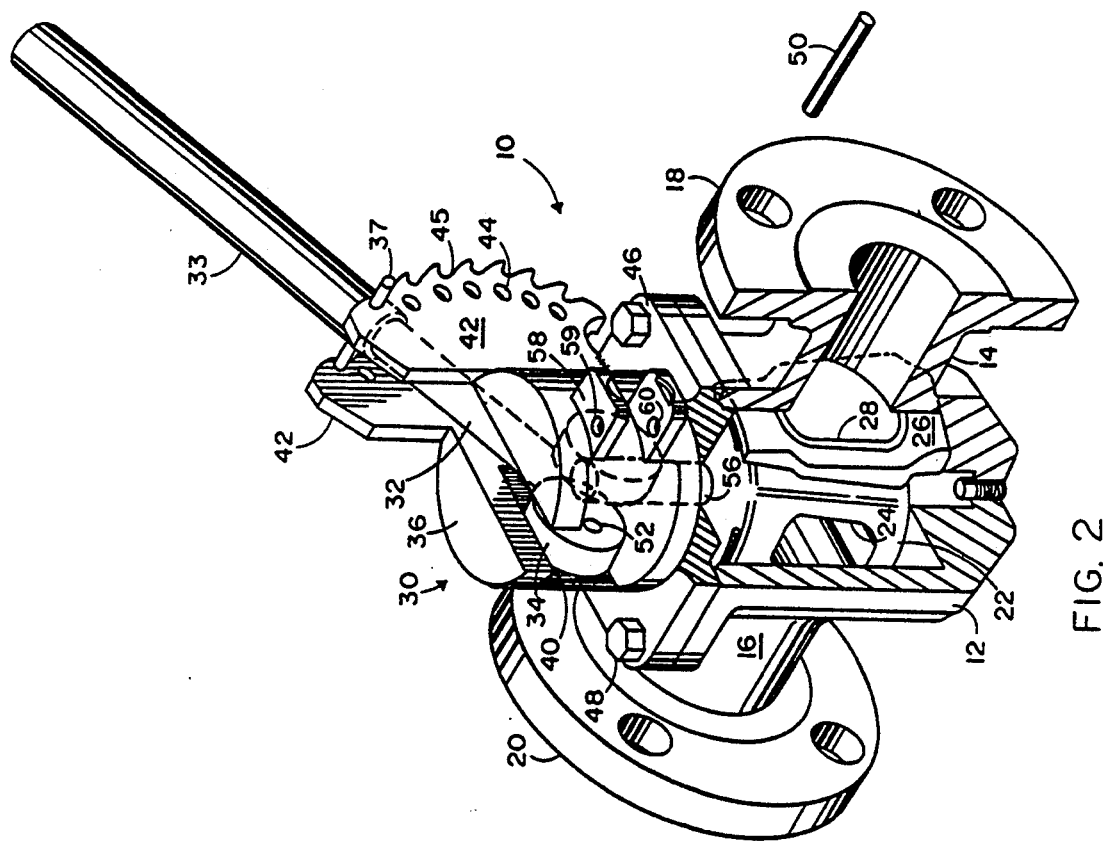
FIGS. 2 and 3 are prior art illustrations of a lever operated retractable sealed double-block and bleed plug valve illustrating the use of detent mechanisms therein.
Figure 3:
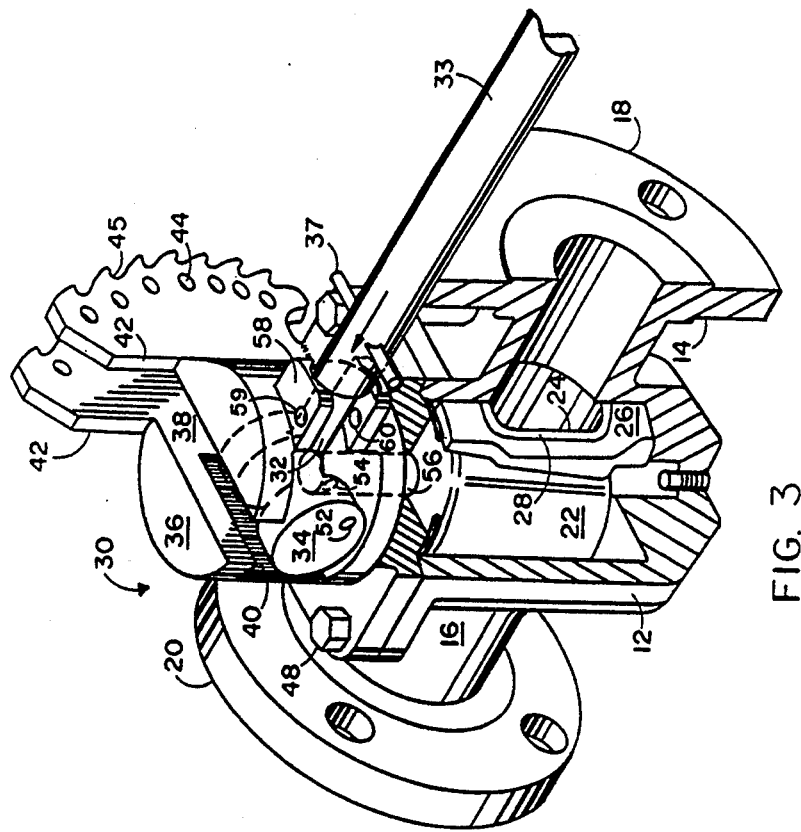

Referring first to the prior art FIGS. 1-3, it will be seen that a typical plug valve 10 of the prior art comprises a body 12 having an inlet 14 and an outlet 16. The flow of fluid such as water between the inlet 14 and the outlet 16 may be controlled by the position of a plug 22 and a pair of slips 26. The plug 22 and the slips 26 are interconnected for common rotational motion but relative axial motion which because of the complementary wedge shape of the slips 26 and the adjoining surfaces of the plug 22 either increases or decreases the distance between the slips for either sealing the valve in a closed position or withdrawing the slips inwardly in the process of opening the valve. When the valve 10 is in a closed position, the slips 26 bear firmly against the inside surface of the inlet and outlet as a result of the radial force of the plug 22. In this configuration a flow passage 24 which is oriented perpendicular to the slips in the plug 22 is positioned so that no fluid passes therethrough. Opening of the valve 10 requires relative axial motion of the plug 22 in an upward direction for the configuration shown in FIG. 1 thereby pulling off the slips 26 from the interior surface of the inlet 14 and the outlet 16. The plug and slips are then rotated in order to align the flow passage 24 with the inlet 14 and the outlet 16 permitting fluid to flow therethrough. The axial and rotational motion of the plug 22 and the slips 26 is controlled by a stem or upper trunnion 23 which is in turn connected to an operator one example of which is discussed hereinafter in conjunction with FIGS. 2 and 3.

In the conventional plug valve 10 of the prior art shown in FIG. 1, plug 22 not only provides a stem or upper trunnion 23 but also a lower trunnion 25. Trunnions 23 and 25 are designed to bear the load exerted on the plug by the fluid when the valve 10 is in its closed position. This load is transmitted to the body 12 by means of bushings 17 and 27 for the upper and lower trunnions respectively. Bushing 17 provides a means of transferring lateral loads of the plug against a bonnet 13 while still permitting the plug assembly to be rotated and moved axially for purposes of opening and closing in the manner described. Bushing 27 performs the same function with respect to the lower plate 15. Packing 19 is provided in order to seal off the fluid from the operator. Reference will now be made to FIGS. 2 and 3 in which there is disclosed a typical manual operator for use with the plug-type valve 10 of the prior art.

It will be understood by those having skill in the relevant art that the plug-type valve of the general construction illustrated in FIGS. 2 and 3 may be successfully utilized with slips and seals on both sides of the plug for sealing both upstream and downstream channels relative to the valve plug or may be alternatively utilized with a single such slip and seal arrangement preferably on the upstream side of the valve. In either case it will be observed that the valve is shown in the closed position in FIG. 2 wherein the passageway 24 has been rotated until its axis is substantially perpendicular to the inlet and outlet channels 14 and 16 respectively. In addition, plug 22 has been forced into its lower-most position in the valve body 12 thereby applying laterally outward directed pressure against the flat wedged surface of slip 26 to forcefully engage seal 28 with the perimeter of channel 16 along the inside surface of the valve body 12. It will be further observed that in order to effect opening of the valve without forcefully rubbing or scraping seal 28 against the valve body surface, two sequential and independent forms of motion are needed. These two motions comprise a vertical motion of plug 22 sufficient to reduce the pressure of the seals against the valve body surface to avoid the aforementioned scraping and a subsequent rotation of plug 22 to effect alignment of the passageway 24 with input and output channels 14 an 15, respectively, thereby enabling unobstructed fluid flow through valve 10. It will be further observed that the closing of the valve is achieved by carrying out the aforementioned sequential motions in the opposite order. Thus, to place valve 10 in the closed position, plug 22 is rotated is rotated until passageway 24 is again perpendicular to the inlet and outlet channels and then vertical downward motion of plug 22 is applied to achieve requisite sealing pressure to the slips 26 and seals 28, respectively, thereby enabling blockage of the fluid flow through the valve 10 and also assuring a good seal to prevent inadvertent leakage.

FIG. 2 also illustrates a typical lever operator apparatus that may be connected to valve 10 in order to effectuate the aforementioned sequential motions of plug 22 for opening and closing the valve as previously described. More specifically, it is seen in FIG. 2 that the operator apparatus 30 comprises an elongated lever arm 32 which terminates at the valve end in a pair of circular cams 34 and which terminates at the other end in concentric engagement with an outer tubular handle 33. Arm 32 and handle 33 are interconnected in tensioned engagement. Operator apparatus 30 also comprises an operator housing 36 which is of a generally hollow cylindrical configuration and which comprises a vertical motion gate 38, a horizontal motion gate 40, a pair of ears 42 and a housing base 46. Cams 34 each provide an eccentrically located pinhole 52 aligned with corresponding pinhole 54 in the valve plug trunnion 56. A pin 50 is adapted to extend through both cams 34 and through trunnion 56 by means of the aforementioned align holes to provide the requisite attachment of the lever arm 32 to the plug 22. When the plug valve 10 is in the closed position as represented by FIG. 2, lever arm 32 is positioned substantially horizontally between ears 42 with outer handle 33 and a pin 37 compressively engaging a selected number of notches 45 provided along the outer edge of ears 42. The compressive engagement of outer handle 33 with notches 45 provides a secure closed position of valve 10. However lever arm 32 may be positively locked in this position by the insertion of a padlock or other similar locking mechanism through selected locking holes 44 of ears 42 to prevent any substantial motion of lever arm 32 in the closed valve position.

When it is desired to open the plug valve 10 to enable fluid to flow therethrough, the locking apparatus is removed and the outer handle 33 is pulled away from the cam end of the lever arm coaxially with the arm until the handle 33 including pin 37 is disengaged from notches 45 thereby freeing the arm 32 for motion within the housing 36. At this point lever arm 32 may be moved in only one direction, namely, along an arc having a center point coincident with the axes of pin 50 and eccentrically located cam holes 52. This motion is restricted by vertical motion gate 38 forming part of a housing 36. It will be understood that this arcuate motion of lever arm 32 produces upward vertical motion of trunnion 56 and plug 42 as a result of the eccentric location of cam holes 52. The lever arm 32 is swung through an arc of about 180 degrees until it is again substantially horizontal on the opposite side of housing 36. At this point trunnion 56 and therefore plug 22 will be at their maximum upward vertical positions with respect to the valve body 12. As a result, plug 22 will be substantially higher within valve body 12. Relative slippage of the wedged-shaped surfaces between plug 22 and slips 26 permits inward radial movement of the slips thereby substantially reducing the pressure of seals 28 against the inside surface of valve body 12 along the perimeter of inlet and outlet channels 14 and 16, respectively.

Plug assembly 22 including slips 26 is then in a condition for rotational motion through an arc of approximately 90 degrees to place passageway 24 in substantial alignment with inlet and outlet channels 14 and 16 but without scraping seals 28 against the inside surface of valve body 12. This rotational motion is effected by again swinging lever arm 32 through an arc but in this case through an arc in a horizontal plane within horizontal motion gate 40 of operator housing 36. It will be observed that at the termination of this horizontal 90 degree arc, lever arm 32 is substantially aligned with outer channel 42 of valve 10 and passageway 24 is in substantial alignment with channels 14 and 16 thus placing valve 10 in a fully opened configuration as represented by FIG. 3. It will be observed in FIG. 3 that in order to place lever arm 32 in a fully open position as shown therein it is necessary to clear the outer-most surface of a pair of flats 58. This is accomplished by again pulling outer handle 33 in a direction opposite cams 34 in a sufficient distance to clear the surface of flats 58 and allowing handle 33 to rest against the outside surfaces thereof. It will be observed in FIG. 3 that in this position means are provided to again lock the lever arm, namely, by placing a suitable locking device such as a padlock through suitably located holes 59 and 60 in flats 58 thereby securely locking plug valve 10 in an open position.

It will be understood that the aforementioned sequential arcuate movements of lever arm 32 may be carried out in reverse order thereby again positioning lever arm 32 as illustrated in FIG. 2 and placing valve 10 in the closed configuration. It will also be observed that housing 36 may be secured to valve body 12 by means of bolts 48 through a plurality of holes in base 46 aligned with suitably matched threaded holes in the upper surface of valve body 12. Such means for interconnecting operator housing in valve body 12 permits easy installation of the manual operator into existing plug-type valves.

The detent relationship between the flats 58 and the handle 33 is required to keep the valve in its open position to resist an inherent closing torque due to the force of flow through the passageway 24 in the plug 22. This is just one example of the need to hold open double-block and bleed plug valves using mechanical detents and the like. It will be understood that hand operated valves also use a detent plunger for holding open a plug valve and that gear operated valves use self-locking worm gears to accomplish the same result. The present invention is designed to minimize or entirely eliminate the need for such mechanical means for holding a plug-type valve in its open position. This is accomplished in the present invention by generating a stabilizing torque which either adds to or entirely replaces mechanical detents. The manner in which the stabilizing torque of the present invention is generated is illustrated in FIGS. 4 and 5 to which reference will now be made.

Figure 4:
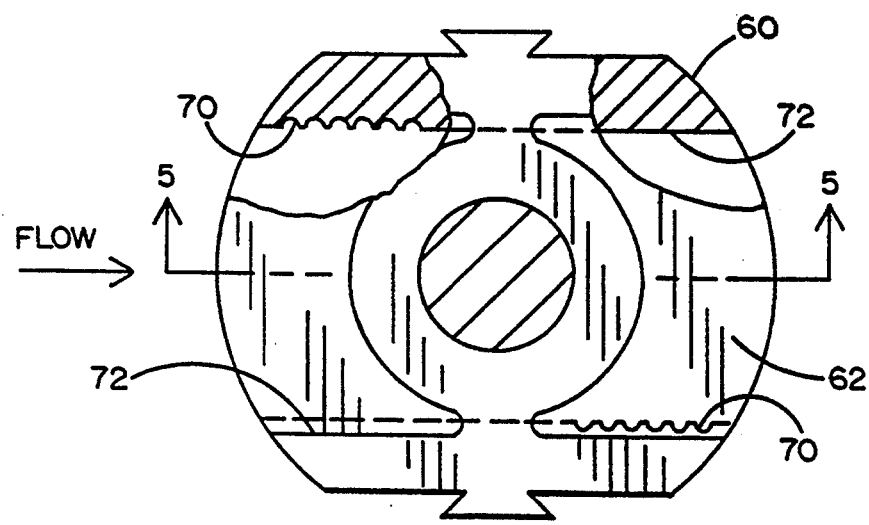
FIG. 4 is a partially cross-sectioned top view of a first embodiment of the plug of the present invention.
Figure 5:
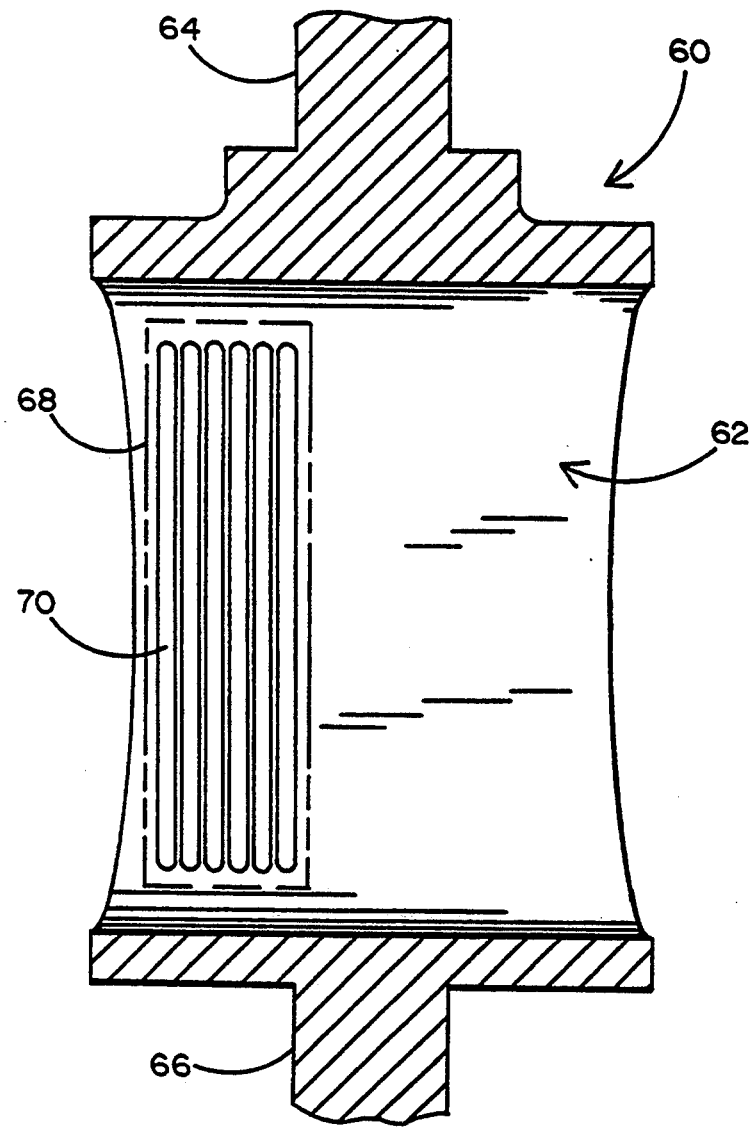
FIG. 5 is a partially cross-sectioned front view of the first embodiment of the plug of the present invention.

As shown in FIGS. 4 and 5 a plug 60 configured in accordance with the present invention and having a passageway 62 for flow of a media therethrough is conventional in most respects having an upper trunnion 64 and a lower trunnion 66 as well as the passageway 62. However, unlike conventional plugs of the prior art plug 60 provides a pair of diagonally located perturbation areas 68 each having a series of voids or bumps 70 designed to cause a turbulent boundary layer flow adjacent the perturbation areas. On the other hand, the flow passage 62 also includes two areas which are smooth, namely, area 72 on each side of the plug passageway 62. These two smooth surfaces within the plug passageway permit laminar boundary flow adjacent those portions of the plug passage. The turbulent boundary layer flow produces a fluid pressure adjacent the perturbation area which is lower than the pressure adjacent the laminar boundary flow area 72. This pressure difference creates a torque which is equal to two times the pressure difference, times the area of the perturbation regions 70, times the area A of the perturbation area 68, times the distance between the center of the plug and the center of the perturbation area 68. In addition, because the passageway provides perturbation areas which are diagonally oriented with respect to the flow passage 62, the above-noted torque is produced in the same direction irrespective of the direction of flow through the passageway. Of course it will be understood that the perturbations 70 are located to produce a turbulent boundary layer flow relative to the laminar boundary flow areas 72 to create a torque which is in the direction of opening the plug thereby resisting the inherent closing torque that otherwise requires the use of mechanical detent mechanisms as previously described. The actual magnitude of this torque tending to keep the valve plug in its open position will depend upon the extent of the difference in the pressures as well as the area of the perturbation region 68 and the size of the plug which affects the rotational moment created by the pressure differential. This will of course depend to a great extent upon the size and shape of the plug 60. Thus it should be understood that the actual size and shape of the perturbation area 68 as well as the number and geometry of the actual perturbations may be varied depending upon the torque required and the available area to create such perturbations on the plug flow passageway surface. In addition, the actual shape of the perturbations, whether they be voids or bumps, will be designed with the medium viscosity and other flow characteristics taken into account to achieve the desired turbulent boundary layer flow to reduce the perturbed boundary layer pressure to the extent necessary to create the desired torque.

Figure 6:
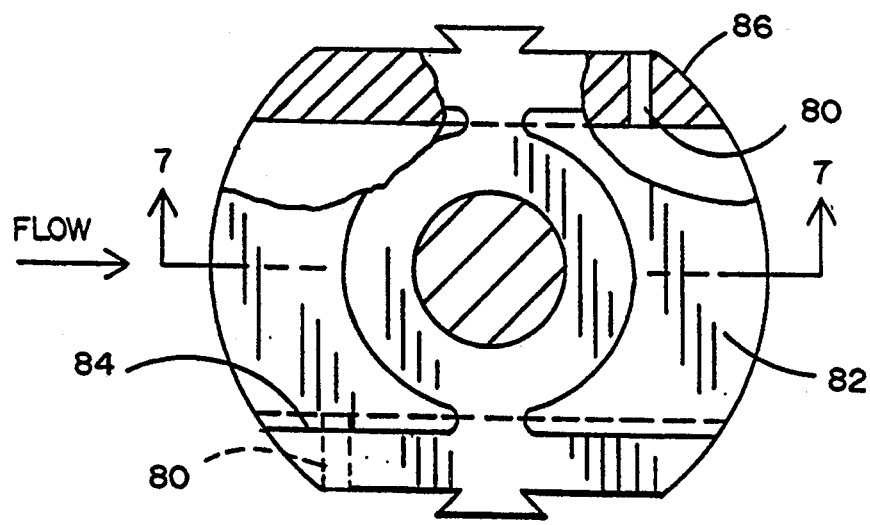
FIG. 6 is a partially cross-sectioned top view similar to that of FIG. 4, but illustrating an alternative embodiment.
Figure 7:
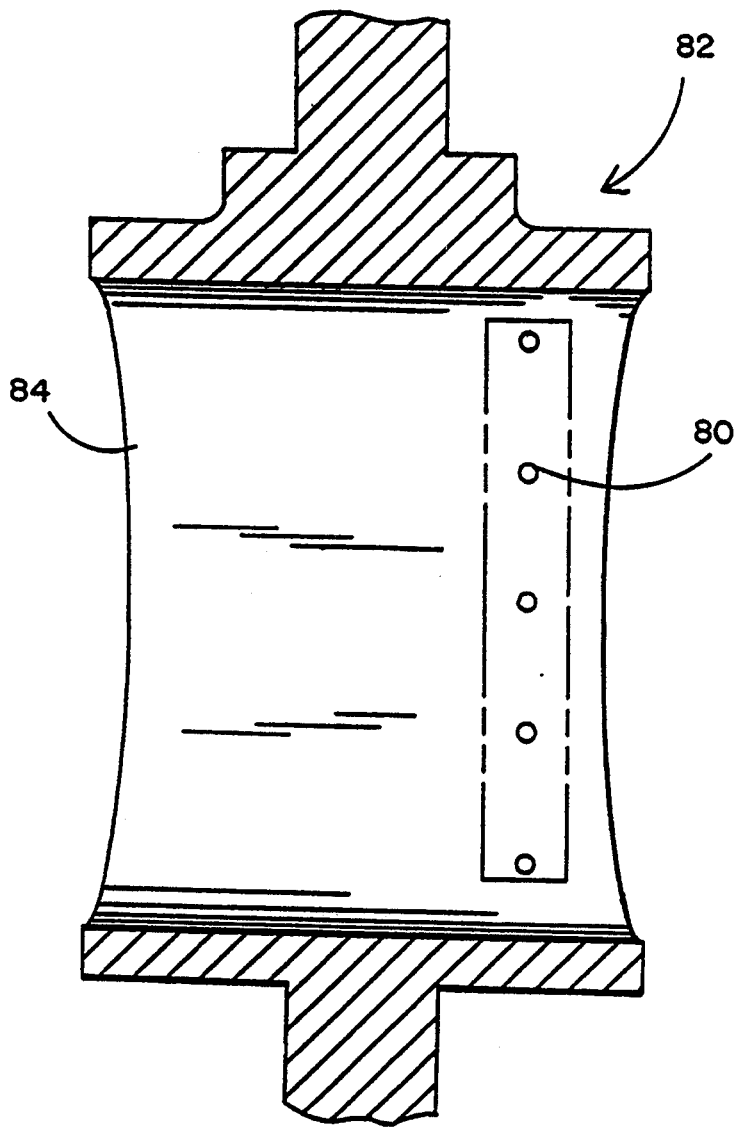
FIG. 7 is a partially cross-sectioned front view similar to that of FIG. 5, but illustrating the alternative embodiment of FIG. 6.

The desired torque may also be achieved by means of the alternative embodiment illustrated in FIGS. 6 and 7. In this embodiment, the boundary layer pertubations are replaced by pilot pressure passages or holes 80. These holes 80 are located on diagonally opposing locations on the plug 82 and extend from the plug interior 84 to the plug exterior 86. These holes 80 equalize pressure between interior 84 and exterior 86 and thus equalize dynamic forces at their respective diagonally opposed locations. The absence of such pressure equalizing pilot holes on the remaining two diagonally located areas of the plug 82, permits the existance of small differential pressures which, in turn, generate minor dynamic fluid forces. These forces generate a small plug opening torque which stabilizes the plug 82 in the open position.

It will now be understood that what has been disclosed herein comprises an improved plug for a retractable seal double-block and bleed plug valve. The improvement comprising a modified plug passageway surface wherein a first embodiment has two surface perturbation areas are distributed diagonally across the plug center line on sufficiently large distributed areas to create a stabilizing torque effect independent of the direction of the flow of fluid through the valve plug. These perturbations may be in the form of recess voids or bumps which are shaped in a way to cause turbulent flow adjacent to the plug flow path to reduce the local flow pressure adjacent the perturbation surface. A second embodiment comprises pilot holes to equalize pressure on only two diagonally-opposed surfaces thereby also producing a stabilizing torque. The resulting torque may be sufficient to eliminate or at least minimize the need for mechanical detents to keep a plug valve in its open position while resisting the inherent torque produced by flow through the valve which would otherwise tend to close the plug. Such an improved plug minimizes wear on detent parts and increases the overall stability of the plug valve. In addition it may eliminate or at least minimize sudden valve closure which can produce a dangerous water hammer effect. In addition, the improvement to the plug of the present invention is relatively immune to mechanical vibration which can otherwise loosen detent mechanisms which can result otherwise in valve slams and produce piping failures and environmental leaks. In addition the present invention by either eliminating or minimizing the need for mechanical detent mechanisms can reduce the wear and expense of mechanical parts otherwise needed to resist the closing torque produced by flow through the plug valve. Furthermore, by reducing the needed size of valve operators and the attendant friction, the invention saves energy and is thus potentially advantageous to the environment. Because operators associated with plugs of the present invention can be smaller, the valve is less expensive and sized to fit into smaller areas. In addition, less machining and casting detail is required if the detent mechanism can be eliminated or minimized thus also tending to reduce the cost of plug-type valves using the present invention. As a result it will be seen that the improvement of the present invention is highly advantageous in that it can produce a significant cost savings and increase the reliability of plug-type valves without the addition of any mechanical parts but only with the treatment of the plug passageway surfaces to create the turbulent boundary layer flow or pilot hole pressure effect described herein.

Those having skill in the art to which the present invention pertains will now, as a result of Applicant's teaching herein, perceive various modifications and additions which may be made to the invention. By way of example, as previously noted the precise shape of the pilot holes or perturbations and the geometry of the pilot hole or perturbation area may be altered to accommodate plug size and shape of virtually any configuration. Accordingly, all such modifications and additions are deemed to be within the scope of the invention which is to be limited only by the claims appended hereto and their equivalents.

I claim:

1. An improved plug for a plug-valve, the plug being rotatable about a rotation axis and having an exterior and an interior, the interior being formed by a flow passageway between opposing surfaces on the exterior to carry fluid through the plug when the plug is oriented in a valve body to align the flow passageway with the flow of the fluid into the valve, the plug blocking the fluid when the plug is oriented in a valve body to align the flow passageway substantially perpendicular to the flow of the fluid into the valve; the improvement comprising:

means in said flow passageway for altering the fluid pressure at a selected area therein;
   said fluid pressure altering means being positioned on a pair of diagonally opposite surfaces of said interior relative to said rotation axis to create a torque in response to fluid flow through said passageway.

2. The improvement recited in claim 1 wherein said torque is in a direction tending to keep said passageway aligned with said flow of fluid into said valve.

3. The improvement recited in claim 1 wherein said fluid pressure altering means comprises perturbations along the passageway surface causing adjacent turbulent boundary layer flow.

4. The improvement recited in claim 3 wherein said perturbations comprises a plurality of bumps in said passageway surface.

5. The improvement recited in claim 3 wherein said perturbations comprises a plurality of recesses in said passageway surface.

6. The improvement recited in claim 1 wherein said fluid pressure altering means comprises at least one pilot hole between the interior and exterior of said plug.

7. A plug for use in a plug valve, the plug of the type having a passageway for permitting flow of a fluid through the valve when the plug passageway is rotated to be in the direction of the fluid flow, the plug comprising:

fluid pressure altering perturbations in diagonally opposing surfaces of said passageway to generate a torque on said plug, said torque being directed to maintain said passageway in said direction of fluid flow.

8. The plug recited in claim 7 wherein said perturbations comprise bumps in said passageway surfaces.

9. The plug recited in claim 7 wherein said perturbations comprise recesses in said passageway surfaces.

10. A plug for use in a plug valve, the plug of the type having a passageway for permitting flow of a fluid through the valve when the plug passageway is rotated to be in the direction of the fluid flow, the plug comprising:

fluid pressure altering pilot holes in diagonally opposing surfaces of said passageway to generate to a torque on said plug, said torque being directed to maintain said passageway in said direction of fluid flow.

* * * * *